United States Patent
Kelly

(10) Patent No.: US 9,554,580 B2
(45) Date of Patent: Jan. 31, 2017

(54) SYSTEM AND APPARATUS FOR CONTROLLING BLISTERING

(71) Applicant: FRITO-LAY NORTH AMERICA, INC., Plano, TX (US)

(72) Inventor: Joseph William Kelly, Grapevine, TX (US)

(73) Assignee: Frito-Lay North America, Inc., Plano, TX (US)

( * ) Notice: Subject to any disclaimer, the term of this patent is extended or adjusted under 35 U.S.C. 154(b) by 55 days.

(21) Appl. No.: 13/926,572

(22) Filed: Jun. 25, 2013

(65) Prior Publication Data
US 2014/0377438 A1 Dec. 25, 2014

(51) Int. Cl.
| | |
|---|---|
| A21C 9/00 | (2006.01) |
| A21D 8/02 | (2006.01) |
| A21C 11/12 | (2006.01) |
| A21D 8/06 | (2006.01) |
| A21D 13/00 | (2006.01) |

(52) U.S. Cl.
CPC .............. *A21D 8/02* (2013.01); *A21C 11/12* (2013.01); *A21D 8/06* (2013.01); *A21D 13/0074* (2013.01)

(58) Field of Classification Search
CPC ........ A21D 8/02; A21D 8/06; A21D 13/0074; A21C 11/12
USPC .................. 83/660, 866–868, 665, 523, 563, 595,83/591, 596, 613, 614.592; 30/293, 365; 366/69; 99/485; 426/549
See application file for complete search history.

(56) References Cited

U.S. PATENT DOCUMENTS

| | | | |
|---|---|---|---|
| 2,905,559 | A | 9/1959 | Anderson |
| 2,916,378 | A | 12/1959 | Kunce |
| 3,278,311 | A | 10/1966 | Brown |
| 3,608,474 | A | 9/1971 | Liepa |
| 3,685,313 | A | 8/1972 | Rhodes |
| 3,880,069 | A | 4/1975 | Moline |
| 3,883,671 | A | 5/1975 | Shatila |
| 4,170,659 | A | 10/1979 | Totino |
| 4,395,216 | A | 7/1983 | Anetsberger |
| 4,405,298 | A | 9/1983 | Blain |
| 4,435,145 | A * | 3/1984 | Abrams ................. A21C 3/021 30/307 |

(Continued)

FOREIGN PATENT DOCUMENTS

WO   WO 2011160669 A1 * 12/2011

OTHER PUBLICATIONS

PCT International Search Report and Written Opinion for PCT/US14/43874 mailed Sep. 24, 2014 (8 pages).

(Continued)

*Primary Examiner* — Jianying Atkisson
(74) *Attorney, Agent, or Firm* — Stephen Y. Liu; Colin P. Cahoon; Carstens & Cahoon, LLP

(57) ABSTRACT

A system and method for controlling blisters. The method begins by mixing the ingredients to form a dough with a moisture content between about 35% and 60%. The dough is sheeted and cut. Thereafter, the dough is pre-heated to reduce the moisture content to between about 10% and about 45%. The preforms are then docked and dehydrated. The docking system, in one embodiment, has a backing plate and a docking device with at least two docking pins of varying lengths. The docking device is adjustable relative to the backing plate. The system also has a removing plate which removes preforms from the docking pins.

12 Claims, 4 Drawing Sheets

(56) References Cited

U.S. PATENT DOCUMENTS

| | | | |
|---|---|---|---|
| 4,521,174 A * | 6/1985 | Kornhauser | A21C 3/021 |
| | | | 425/194 |
| 4,574,090 A | 3/1986 | Paulucci | |
| 4,606,923 A | 8/1986 | Ricke | |
| 4,650,687 A | 3/1987 | Willard | |
| 4,861,609 A | 8/1989 | Willard | |
| 4,889,733 A | 12/1989 | Willard | |
| 4,889,737 A | 12/1989 | Willard | |
| 4,931,303 A | 6/1990 | Holm | |
| 4,994,295 A | 2/1991 | Holm | |
| 5,554,405 A | 9/1996 | Fazzolare | |
| 5,652,010 A | 7/1997 | Gimmler | |
| 5,690,982 A | 11/1997 | Fazzolare | |
| 5,695,804 A | 12/1997 | Hnat | |
| 5,747,092 A | 5/1998 | Carey | |
| 5,928,700 A | 7/1999 | Zimmerman | |
| 5,980,967 A | 11/1999 | Carey | |
| 6,001,409 A | 12/1999 | Gimmler | |
| 6,227,093 B1 | 5/2001 | Rensky, Jr. | |
| 6,530,771 B1 * | 3/2003 | Clark | 425/194 |
| 6,893,673 B2 | 5/2005 | Hander | |
| 7,854,696 B2 * | 12/2010 | Price | A21C 3/021 |
| | | | 492/14 |
| 2008/0038420 A1 | 2/2008 | Dyks et al. | |
| 2010/0215826 A1 | 8/2010 | Campbell et al. | |
| 2012/0009299 A1 | 1/2012 | Xie | |
| 2012/0247222 A1 | 10/2012 | Golovashchenko | |
| 2013/0011512 A1 * | 1/2013 | Moslehi et al. | 425/385 |

OTHER PUBLICATIONS

PCT International Preliminary Report on Patentability for Application No. PCT/US14/43874 mailed Apr. 15, 2015 (6 pages).

* cited by examiner

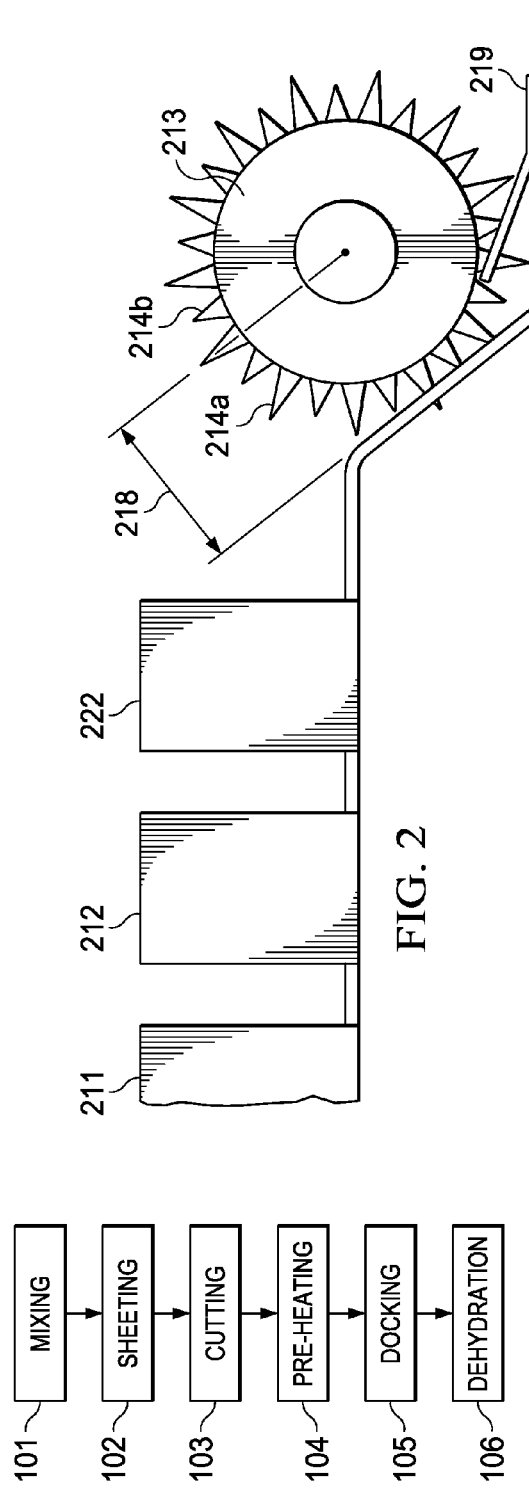

SYSTEM AND APPARATUS FOR CONTROLLING BLISTERING

BACKGROUND OF THE INVENTION

Technical Field

The present invention relates to a system and method for controlling blistering.

Description of Related Art

Upon frying or baking of fabricated snack products, the moisture within the dough is converted to steam causing the pieces to expand. The steam accumulates between the outer surfaces of the dough pieces during frying or baking. The outer surfaces of the snack piece lose moisture faster than the center of the piece, due to more rapid heat transfer at the surface when frying or baking. When the surface dries sufficiently, it forms a skin which prevents the steam from escaping. The trapped steam causes the sides of the dough piece to separate, or delaminate, forming a hollow void. This phenomenon is referred to as "pillowing" or "blistering." Often such blisters detract from the appearance of the snack and can break, causing holes in the product. Consequently, it desirable to achieve a method and system for controlling blistering.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a flow chart of a method of controlling blistering in one embodiment;

FIG. 2 is a side view of a docking system in one embodiment;

FIG. 3 is a front view of a docking device in one embodiment;

DETAILED DESCRIPTION

Figure 4:
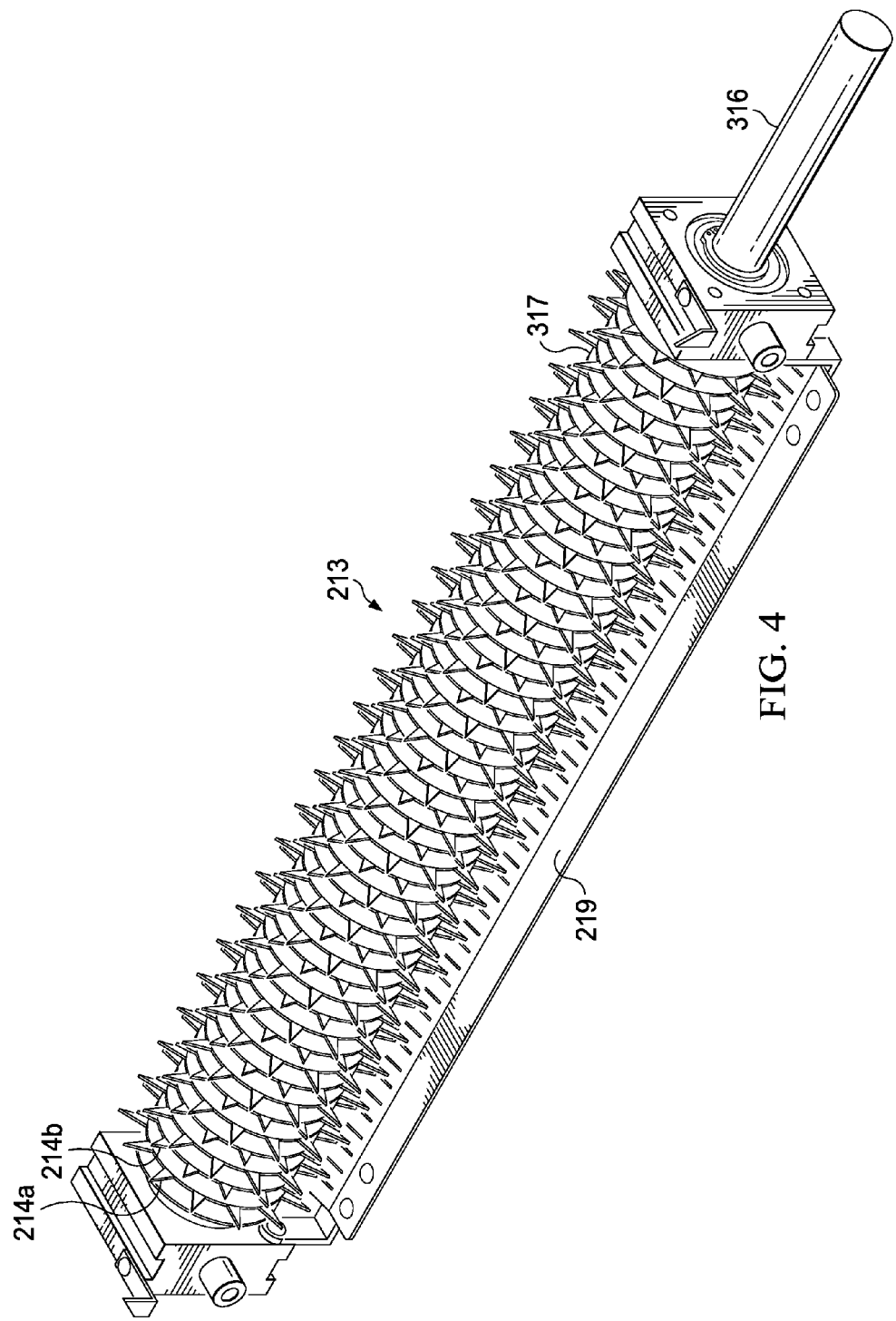
FIG. 4 is a perspective view of a docking device in one embodiment.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

FIG. 1 is a flow chart of a method of controlling blistering in one embodiment. The first step is mixing 101 to create a dough, wherein the dough comprises a moisture content. The mixing step 101 can utilize any mixing equipment to form a dough. The dough can comprise a variety of ingredients used to make expanded snack products. The primary farinaceous ingredient, in one embodiment, can include corn, potato, rice, oats, tapioca, wheat, lime-treated corn, buckwheat flour, bean flour, barley flour, wheat germ, rye flour, sorghum flour, graham flour, and mixtures thereof. Optional ingredients include starches (pregelatinized or cook-up, chemically modified or unmodified), leavening ingredients, proteins, and fats and emulsifiers.

The ingredients may be used in the form of a flour or meal, or may start as intact kernels that are hydrated and/or gelatinized as part of the process. In one embodiment these kernels are then milled prior to incorporation into a dough. The dough can comprise both uncooked flour/meal, as well as cooked/hydrated/milled kernels. In one embodiment, the primary farinaceous materials and the optional ingredients (starches, leavening, proteins, fats) are then blended together, along with water to form a dough with a moisture range of from 30% to 65% of the weight of the total dough in one embodiment and from between about 35% to about 60% in another embodiment. The order of addition of the ingredients, and manner of mixing, can be varied.

After the mixing step 101, the dough is subjected to a sheeting step 102. The dough can be sheeted to a variety of thicknesses, and in one embodiment is sheeted to a thickness of between about 0.015 inches to about 0.10 inches in thickness. In another embodiment the dough is sheeted to a thickness of between about 0.025 and about 0.05 inches. Any sheeting apparatus known in the art can be utilized in the sheeting step 102.

After sheeting 102, the sheeted dough is subjected to an optional cutting step 103 whereby the dough is cut into individual pieces, or preforms. Any cutting or stamping equipment which cuts the sheeted dough into individual preforms can be utilized. The preforms can vary in size and range from a length from about 1 inch to about 6 inches. In one embodiment the preforms are about 3.5 inches wide and about 3.6 inches tall. In one embodiment the preforms have a surface area between about 5 square inches to about 15 square inches. The preforms can vary in weight and in one embodiment range from about 2 grams to about 10 grams. In another embodiment the preforms weigh about 7 grams. The preforms can also vary in shape. In one embodiment the preforms are triangular in shape.

In one embodiment, the preforms comprise essentially uniform moisture, with no significant difference between the surface and interior of the preform, in either moisture or consistency. Handling the preforms at this stage is difficult as they are weak in structure and sticky to the touch.

After the cutting step 103, the preforms are subjected to a pre-heating step 104. The pre-heating step 104 can comprise microwave, infrared, radio frequency, fixed air dryer, air impingement, convective air, heated surface conduction, other heating devices, and combinations thereof. A pre-heating step 104 is a separate step which occurs prior to the dehydration step 106. During the pre-heating 104 the moisture content of the preforms is reduced. In one embodiment, the moisture content after the pre-heating step 104 ranges between about 10% and 45%. In one embodiment the pre-heating step 104 reduces the moisture content of the preforms by between 10-50%.

The pre-heating step 104 can comprise varying duration and heat intensities. In one embodiment, the pre-heating step 104 results in a semi-rigid partially cooked pre-form with a non-uniform moisture distribution. A non-uniform moisture distribution, as used herein, refers to a moisture distribution which is non-uniform. For example, in one embodiment, the moisture content of the surface of the preform is less than the moisture content in the center of the preform.

After the pre-heating step 104 is the docking step 105. In the docking step 105 the preforms are punctured with docking pins. Docking, as used herein, refers to a penetration of preforms or sheeted dough such that at least the top layer is pierced. In one embodiment the docking pins completely pierce the preforms such that the top layer and bottom layer are pierced. In one embodiment completely piercing the preforms results in small holes in both the top layer and bottom layer. Embodiments wherein the docking pins do not completely penetrate the pre-forms are referred to herein as partially piercing the preforms.

In one embodiment the docking pins comprise a diameter of 0.1 of an inch or less. Such a diameter, in conjunction with the pre-heating step 104, results in a hole which is not readily visible in the final product. The cohesiveness of the pre-heated dough, in one embodiment, allows the pre-heated dough to reclose or approximately reclose after docking.

Due to the semi-rigid preform surface, the preforms can be removed from the docking pins with the removing plate 219, discussed below, without damage. Further, the pliability and elasticity of the heat treated preforms allows the holes in the preforms to partially close resulting in a smaller hole in the final product. This is a benefit as consumers expect to see docking holes in crackers, for example, but do not desire to see docking holes in chips and other non-cracker snack food products.

After the docking step 105 is the dehydration step 106. The dehydration step 106 can comprise any dehydration step known in the art for reducing moisture content and includes, but is not limited to, baking and frying. In one embodiment, the docked preforms are dehydrated to a final moisture content of less than 4%.

While a method for reducing blistering has been described, an apparatus for docking in one embodiment will now be described. FIG. 2 is a side view of a docking system in one embodiment. As shown the system has a sheeter 211, a cutter 212, a pre-heater 222, and a docking device 213. The sheeter 211 can be any sheeter known in the art which forms a sheet of dough. The optional cutter 212 can include any cutter known in the art which cuts preforms into shapes. The pre-heater 222 can comprise any heating device known in the art as described above.

After being sheeted, cut, and pre-heated, the pre-heated preforms are fed to the docking device 213. As depicted, in one embodiment the backing plate 215 is angled relative to the horizon. The backing plate 215 is a planar plate which supports the preforms as they are being docked. The angle can vary from about 20 degrees to about 90 degrees. In one embodiment the backing plate 215 is angled at about 45 degrees. An angled backing plate 215 has the advantage in that it harnesses the force of gravity to move the product forward. This eliminates the need for a separate conveyor.

Figure 5:
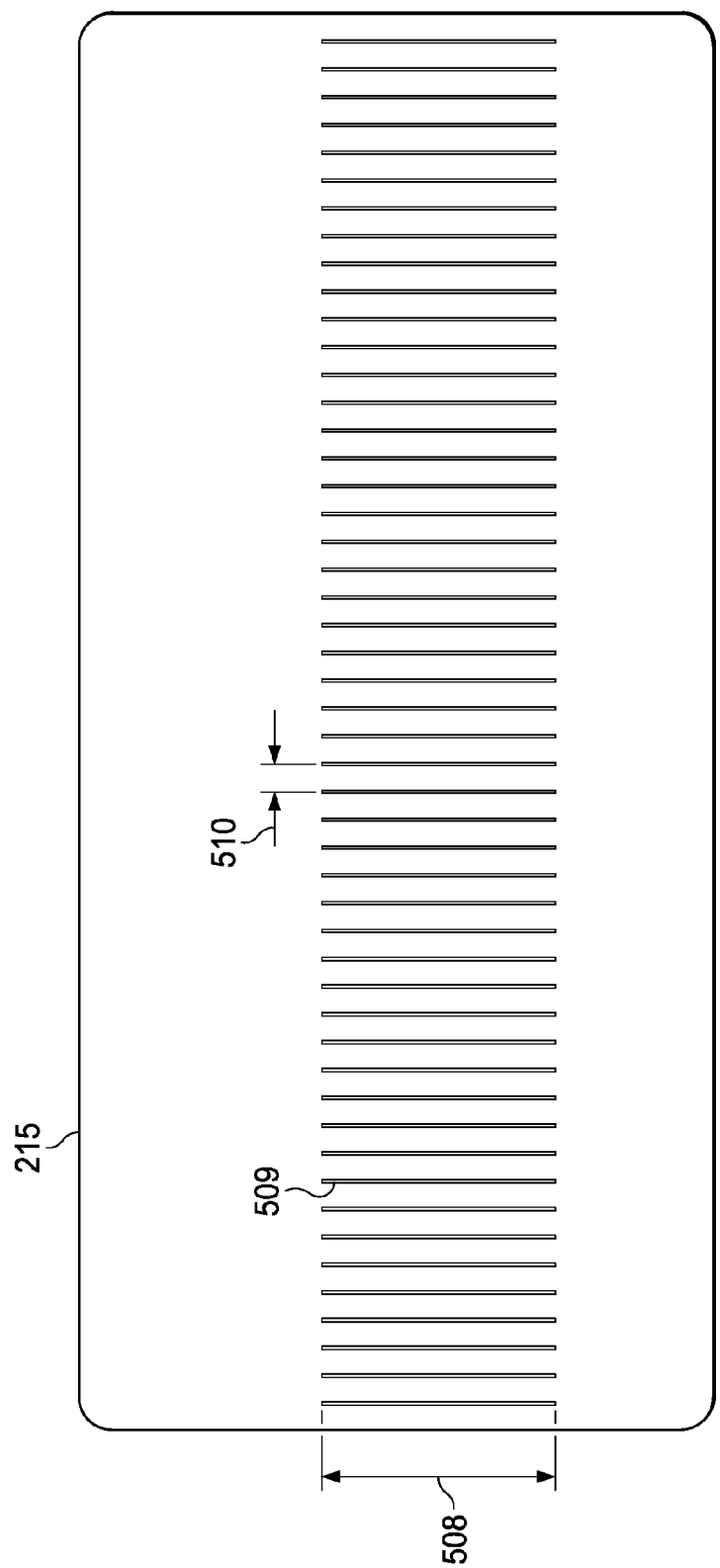
FIG. 5 is a top view of a backing plate in one embodiment.

FIG. 5 is a top view of a backing plate in one embodiment. The backing plate 215 can comprise any food grade material. In one embodiment the backing plate 215 comprises at least one slot 509. These slots 509 receive the docking pins 214a,b. The slots 509 in the backing plate 215 provide sufficient room to allow the docking pins 214a,b to fully penetrate the preforms. Thus, in one embodiment the docking pins 214a,b extend below the planar surface of the backing plate 215 and extend within the slots 509.

As depicted the slots 509 are separated by a slot spacing 510. The slot spacing 510 will vary depending upon the distance separating adjacent docking pins 214a,b. In one embodiment the slot spacing 510 varies between about ⅛ of an inch to about 2 inches.

As depicted the slots have a slot length 508. In one embodiment, the slot length 508 is long enough to allow the preforms to be punctured while preventing contact with the docking pins 214a,b. The slot length 508 will depend upon the diameter of the docking device 213, the thickness of the preforms, the length of the docking pins 214a,b, and other such variables.

Referring back to FIG. 2, FIG. 2 shows the docking device 213 positioned above the backing plate 215. A docking device 213 is any device which comprises at least one docking pin 214a,b and which docks product. As depicted the docking device 213 comprises a cylindrical device with docking pins 214a,b located on the outer periphery of the cylinder. As product is fed between the backing plate 215 and the docking device 213, one or more docking pins 214a,b penetrate the product.

In one embodiment the docking pins 214a,b have uniform length, whereas in other embodiments the docking pins 214a,b comprise a non-uniform length. A docking device comprising docking pins 214a,b with non-uniform length refers to a docking device which comprises at least two docking pins 214a,b which have dissimilar lengths. As depicted, the docking device 213 of FIG. 2 has a plurality of long docking pins 214a and short docking pins 214b.

FIG. 3 is a front view of a docking device in one embodiment. FIG. 4 is a perspective view of a docking device in one embodiment. Referring to FIG. 3, the long docking pins 214a and the short docking pins 214b can be seen spaced along the length of the docking device 213. In one embodiment the separation between docking pins 214a,b along the length coordinate with the slot spacing 510 in the backing plate 215.

While FIG. 3 shows docking pins 214a,b spaced along the length of the docking device 213, in one embodiment docking pins 214a,b are spaced along the rotational axis of the docking device 213. For example, two or more docking pins 214a,b share the same location along the length of the docking device 213 and are spaced along the axis of the cylinder. In one embodiment the docking device 213 comprises two or more docking pins 214a,b along its length and two or more along its rotational axis.

Certain products desire a small amount of blisters while other products desire to remove all or most of the blisters. The size and amount of blisters can be controlled by controlling the number and spacing of the docking pins 214a,b, referred to as the docking pattern. The number of docking pins along the axis and along the length of the docking device 213 can be increased to decrease the number and size of blisters.

In one embodiment the docking pattern can be adjusted by varying the distance between the docking device 213 and the backing plate 215. The docking distance 218 is the shortest distance between the center of the docking device 213 and the backing plate 215.

As depicted in FIG. 2, the docking distance 218 is such that only the long docking pins 214a pierce the preforms. Thus, as depicted, only every other docking pin 214a,b is engaged. However, to increase the docking pattern, the docking distance 218 is decreased so as additional docking pins 214a,b are engaged. For example, the docking distance 218 can be decreased so as to engage the short docking pins 214b.

An adjustable docking device 213 allows the docking pattern to be adjusted without having to otherwise change equipment. In one embodiment an adjustable docking device 213 allows the docking distance 218 to be changed. Such a feature increases the flexibility of the apparatus and decreases downtime when switching between products. If a first docking device 213 having a first docking pattern had to be replaced with a second docking device having a second docking pattern, significant downtime would result. Such a scenario would require also require additional capital as two or more docking devices 213 would be required. However, a single adjustable docking device 213 comprising docking pins of non-uniform heights can provide a variety of docking patterns by simply adjusting the docking distance 218.

In one embodiment the docking device comprises docking pins 214a,b which have two different lengths: a long length and a short length. This allows two different docking patterns. In other embodiments, however, the docking device comprises docking pins 214a,b which comprise three or more different lengths.

As noted, an adjustable docking device 213 is a device in which the docking distance 218 can be adjusted. The docking distance 218 can be adjusted in a variety of methods including unlocking the docking device 213, lowering the docking device 213, and then locking the docking device in the desired location.

As noted, in one embodiment the pre-heated preforms comprise a pliability and a hardness which allows them to be docked without destroying or breaking the preform. For example, if the preforms are too weak, such as masa, the preforms could crumble after being docked. However, a semi-rigid pre-heated product can be successfully docked and removed from the docking pins 214a,b.

Figure 6:
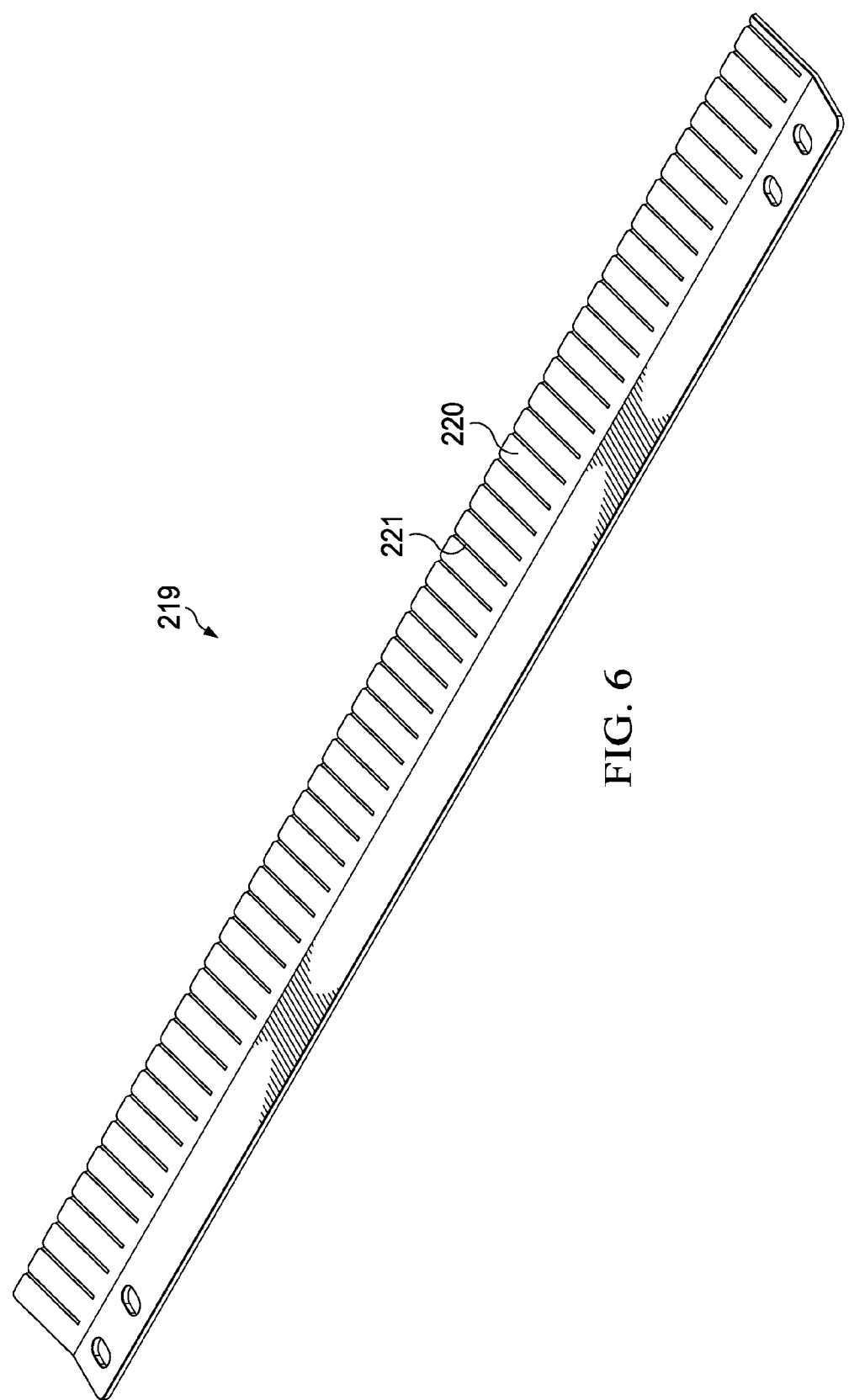
FIG. 6 is a perspective view of a removing plate in one embodiment.

In one embodiment, after the preforms are docked and lodged onto the docking pins 214a,b, they are rotated until they encounter a removing plate 219. Referring back to FIG. 2, FIG. 2 illustrates a removing plate 219. The removing plate 219 is a plate which comprises at least one slot which is aligned with the docking pins 214a,b. In operation, the docking pins 214a,b intersect with the removing plate 219 and the rotational force of the docking pins 214a,b through the removing plate 219 forces the preforms off from the docking pins 214a,b. In this way, the removing plate 219 removes the preforms. FIG. 6 is a perspective view of the removing plate 219. As shown, the removing plate 219 has a plurality of removing plate slots 221 which align with the docking pins 214a,b. Further, the removing plate 219 has a plurality of prongs 220 which are separated by the removing plate slots 221. The number and spacing of the prongs 220 is dependent upon a variety of factors including the number and spacing of the docking pins 214a,b.

The removing plate 219 can be mounted upon the docking device 213 as shown in FIG. 3. In other embodiments the removing plate is not mounted upon the docking device 213 but is instead mounted on other support equipment. The removing plate slots 221 can be seen in FIG. 4. As can be seen, product will be removed from the docking pins 214a,b as they intersect with the removing plate slots 221.

EXAMPLES

The following examples are for illustrative purposes only and should not be deemed limiting.

A corn dough and a wheat dough were prepared for texture profile analysis. The wheat dough was made by adding 2.65 kg of water to 5 kg of wheat in a ribbon blender and blended at 80 rpm for 6 minutes.

The corn masa was made by adding 400 pounds of whole kernel corn to 100 gallons of water and 4 pounds of calcium hydroxide. The mixture was heated to 200° F. for between 15 and 20 minutes. Then, 100 gallons of room temperature water was added to the mixing kettle to reduce the temperature to 145° F. and stop further gelatinization of the corn. The mixture was allowed to steep for 12 hours.

After making both the corn dough and a wheat dough, the doughs were then sheeted between rollers to form a thin, continuous sheet with a thickness ranging from 0.035 inches to about 0.070 inches. The sheet was then cut into triangular shaped preforms having a base of 3.5 inches and a height of 3.6 inches.

Some of the preforms were then heat treated by passing through a toasting oven. The residence time in the oven varied from 14 seconds to 34 seconds, with a temperate range of 500° F. to 610° F. The oven belting was mesh and was multi-pass. After exiting the toasting oven, the moisture content by weight of the preform had been reduced to between 35% and 45%.

The heat treated and non-heat treatment preforms were subjected to a Texture Profile Analysis (TPA). TPA is a method used for determining textural properties of materials. The TPA as performed was described in Bourne M. C. (2002) 2. Ed., Food Texture and Viscosity: Concept and Measurement, the entirety of which is hereby incorporated by reference. The equipment used in the TPA was a TA-XT plus texture analyzer by Texture Technologies of Scarsdale, N.Y. The equipment used a two bite texture profile analysis with a 45° chisel-end blade with a 3 mm thickness and 70 mm length. A two-bite analysis involves pressing into the preform with a chisel, retracting and coming down upon the preform again. Both the first force and the second forces are measured.

The tests are conducted by placing the preforms on a platen under the chisel-end blade such that the blade tip was centered over the preform surface and did not extend past the preform surface. The blade then descends on the preform at a set speed of 0.5 mm/second, compressing it until only 0.05 mm from the surface of the platen. The blade then rises at the same speed, decompressing the preform, until it is clear of the surface of the preform. The preform is then compressed and decompressed a second time at the same settings. Many rheological properties can be derived from this method including hardness and cohesiveness.

The hardness is obtained by measuring the maximum resistance force as the material is first compressed. The units are typically in Newtons or grams. Cohesiveness refers to the rate at which the material disintegrates, or holds together, under mechanical action. It is defined as the ratio of the work done for compression the first time over the work done for the second time.

Results

Non-Heat Treatment Preforms

The non-heat treatment preforms did not remain intact after encountering the docking device. The preforms adhered to the docking pins and upon contacting the removing plate, the preforms would break apart or build-up on the removing plate.

It was determined, in one embodiment, that a hardness value of 5 grams was required to survive impact with the removing plate. No dough obtained a hardness value of 5 grams without being heat treated.

Further, after docking the non-heat treatment preforms, the docking holes were clearly visible in the final dried product. Without being limited in theory, this is believed to be caused because the dough has very little cohesion and does not "spring back" after being compressed by a docking pin. Low cohesion is common in most sheeted doughs because it becomes very difficult to cut highly cohesive doughs into shapes because the dough attempts to spring back after being cut. Thus, most sheeted doughs have low cohesion to avoid the "spring back."

Heat Treatment

The preforms subjected to heat treatment experienced increased cohesiveness compared to the non-heat treatment preforms. Without being limited to theory, this is believed to be due to the drying of the surface and the partial gelatinization of the surface. Applicants have discovered that in one embodiment a cohesiveness of greater than 0.3 allows the dough to spring back sufficiently to reduce the visibility of the docking holes. Such cohesive values were not possible with the non-heat treatment preforms which utilize conventional sheeting equipment.

Accordingly, in one embodiment, Applicants have discovered that to puncture the preforms sufficiently to control blistering, while not causing any deleterious effect to the preforms and minimizing the visibility of docking holes, the preforms are heat treated to create a hardness value of 5 grams or greater and a cohesiveness value of 0.3 or greater, as measured by TPA.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

1. A method for controlling blisters, said method comprising:
    mixing ingredients to form a dough, wherein said dough has a moisture content between about 35% and 60% by weight;
    sheeting said sheeted dough;
    cutting said sheeted dough to form preforms;
    pre-heating said preforms to a reduced moisture content of between about 10% and about 45%;
    docking said preforms;
    dehydrating said preforms to a moisture content of less than 4%.
2. The method according to clause 1 wherein said ingredients comprise a farinaceous ingredient.
3. The method according to any preceding clause wherein said ingredients comprise a primary ingredient, wherein said primary ingredient comprises a farinaceous ingredient.
4. The method according to any preceding clause wherein said sheeted dough comprises a thickness of between about 0.015 and 0.1 inches.
5. The method according to any preceding clause wherein said preforms of said cutting step comprise a uniform moisture content distribution.
6. The method according to any preceding clause wherein said moisture content is reduced by between 10-50% after said pre-heating step.
7. The method according to any preceding clause wherein said preforms comprise a non-uniform moisture content distribution after said pre-heating step.
8. The method according to any preceding clause wherein said docking comprises docking with docking pins located on a rotating docking device.
9. The method according to any preceding clause wherein said docking comprises docking with docking pins, wherein said docking pins comprise a diameter of about 0.1 inches or less.
10. The method according to any preceding clause wherein said dehydrating comprises frying.
11. The method according to any preceding clause wherein said docking comprises completely piercing said preforms.
12. The method according to any preceding clause wherein said preform after said heating step comprises a hardness value of 5 grams or greater.
13. The method according to any preceding clause wherein said preform after said heating step comprises a cohesiveness value of 0.3 grams or greater.
14. A system for docking, said system comprising:
    a backing plate;
    a docking device comprising at least two docking pins, wherein at least two docking pins have different lengths;
    wherein said docking device is separated from said backing plate by a docking distance, and wherein said docking device is adjustable relative to said backing plate.
15. The system according to clause 14 further comprising a sheeter upstream of said docking device.
16. The system according to clause 15 further comprising a cutter upstream of said docking device, wherein said cutter is downstream from said sheeter.
17. The system according to clauses 14-16 wherein said docking device comprises a rotational cylinder.
18. The system according to clause 17 wherein said docking device comprises a plurality of docking pins spaced along the rotational axis of said cylinder.
19. The system according to clauses 14-18 wherein said docking device comprises a plurality of docking pins spaced along the length of said device.
20. The system according to clauses 14-19 wherein said backing plate comprises slots.
21. The system according to clauses 14-20 wherein said backing plate is angled relative to the horizon.
22. The system according to clauses 14-21 wherein said backing plate is angled between 20 degrees and 90 degrees relative to the horizon.
23. The system according to clauses 14-22 wherein said docking device comprises a plurality of short docking pins and a plurality of long docking pins.
24. The system according to clauses 14-23 wherein said docking pins comprise a diameter of about 0.1 inches or less.
25. The system according to clauses 14-24 further comprising a removing plate.

I claim:

1. A system for docking a dough, said system comprising:
    a backing plate;
    a docking device comprising a cylindrical body having at least a first set of docking pins and a second set of docking pins located on an outer periphery of the cylindrical body, wherein each of the first set of docking pins has a first length and each of the second set of docking pins has a second length, and wherein the first length is different than the second length;
    wherein said docking device is separated from said backing plate by a docking distance maintained by a locking mechanism, and wherein said docking distance is the shortest distance between a center of the docking device and the backing plate, and wherein the docking distance is adjustable between at least two docking distances,
    wherein a first docking distance only allows each of the first set of docking pins to engage the dough; and
    wherein a second docking distance allows each of the first set of docking pins and each of the second set of docking pins to engage the dough.
2. The system of claim 1 further comprising a sheeter upstream of said docking device.

3. The system of claim 2 further comprising a cutter upstream of said docking device, wherein said cutter is downstream from said sheeter.

4. The system of claim 1 wherein said docking device comprises a rotational cylinder.

5. The system of claim 4 wherein said docking device comprises a plurality of docking pins spaced along the rotational axis of said cylinder.

6. The system of claim 1 wherein said docking device comprises a plurality of docking pins spaced along the length of said device.

7. The system of claim 1 wherein said backing plate comprises slots, wherein each of the slots defines a hole within the backing plate to receive one of the first set of docking pins.

8. The system of claim 1 wherein said backing plate is angled relative to the horizon.

9. The system of claim 1 wherein said backing plate is angled between 20 degrees and 90 degrees relative to the horizon.

10. The system of claim 1 wherein said docking device comprises a plurality of short docking pins and a plurality of long docking pins.

11. The system of claim 1 wherein said docking pins comprise a diameter of about 0.1 inches or less.

12. The system of claim 1 further comprising a removing plate.

* * * * *